Dec. 25, 1934.  W. C. BURNHAM  1,985,596
BLOCK HOOK
Filed July 21, 1933  2 Sheets-Sheet 1

INVENTOR
WILLIAM C. BURNHAM
BY
Robert N. Eckhoff
ATTORNEY

Patented Dec. 25, 1934

1,985,596

UNITED STATES PATENT OFFICE 1,985,596

BLOCK HOOK

William C. Burnham, Menlo Park, Calif., assignor to Davis Emergency Equipment Company, Incorporated, New York, N. Y., a corporation of Delaware Application July 21, 1933, Serial No. 681,503

11 Claims. (Cl. 24—241)

This invention relates to hooks such as are used by linesmen and others in handling equipment and lines overhead. Due to the hazard of a hook becoming disengaged and falling if the line or rope becomes slack, it is the usual practice to wrap tape about the body of the hook and thus close the throat of the hook. This practice, in so far as safety is concerned, is satisfactory; from a cost and time point it is not, inasmuch as the tape is costly and requires time to place and remove. The block hook of this invention obviates these difficulties and objections by utilizing means to close the throat of the hook. This means, in accordance with my invention, is such that it can be positioned in either a throat open position or a throat closing position, and can be retained and locked in one or the other position.

Since these hooks are used under diverse conditions, including snow, sleet, sand, and mud, I preferably provide the hook in such fashion that clogging by extraneous materials is practically impossible. In addition, accidental release of the locking means is obviated so that the hook is not apt to be released except by the operator.

The invention possesses other features of advantage, some of which, together with the foregoing, will appear in the following wherein a present preferred form of the block hook of my invention is described.

In the drawings accompanying and forming a part hereof, the preferred form of hook is shown;

Figure 1 being a plan view partly cut away to show the operating parts of the invention.

Figure 1:
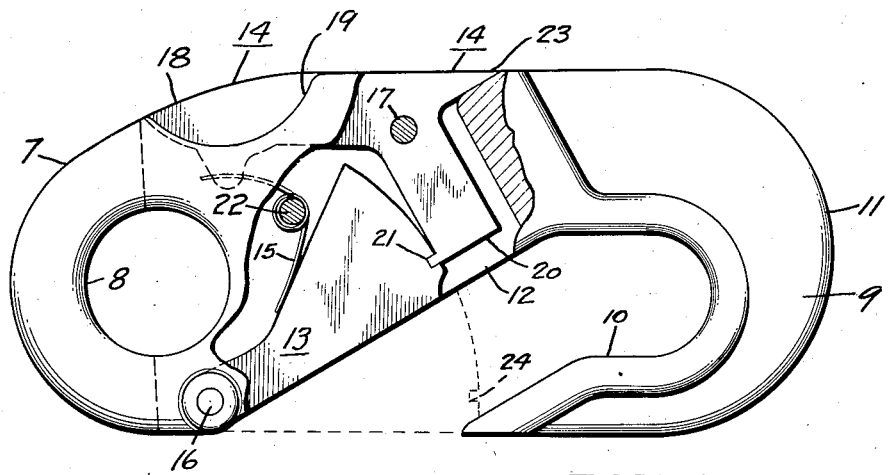

In constructing my present preferred form of hook, I form a body 7 having an aperture 8 for receiving a rope, cable or fixture, the body being of manganese steel usually so as to be of a high strength. The body includes an integral member 9 curved relatively to the body to provide a hook having a throat 10 to receive a ring or other device. The body is ribbed as at 11 to reenforce the member 9 and otherwise strengthen the whole structure.

The body is hollow as at 12 and within this space are mounted a throat closure member 13, a trigger and latching member 14, and a spring 15.

The throat closure member 13 is a segment mounted on a pin 16 and movable between a position wherein the member is wholly within the hollow and a second position wherein the segment is mainly without the hollow so that the throat 10 is closed. The segment is shown in full lines in the first position in Figure 1 and in light lines for the second position. The throat closure member 13 is substantially solid so that nothing can get between it and the body to prevent its release when it is desired to open the throat.

The trigger and latching member 14 is a bell crank mounted on a pin 17. One end 18 of the bell crank extends to the cut away portion 19 of the body. As appears in Figure 1, this end 18 of the member 14 continues the configuration of the body so that the trigger can not be operated accidentally. The other end 20 of the bell crank overlies the segment 13 when the segment is in throat closing position so that the segment is positively locked in that position. An extension 21 engages a notch 24 in the segment and retains it within the hollow 12 of the body to latch the segment in a throat open position.

The spring 15 is positioned about a pin 22 and bears against both the members 13 and 14 to urge them in the same direction so that they are retained in definite positions. To limit movement of member 14 outwardly, an extension 23 is provided thereon to engage the body.

It is to be noted that members 13 and 14 do not move at the same time; after release movement of member 14, member 13 can be moved to the other position whereupon member 14 is moved by spring 15 to latch member 13 in that position to which it has been moved.

The segment, when in throat closing position, can not be released unless the operator first releases the latch and then presses in on the segment; two separate and distinct movements are thus required.

Figure 2:
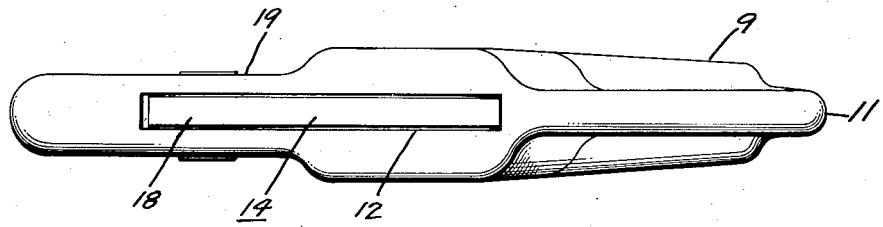
Figures 2 and 3 are side elevations of the hook shown in Figure 1.
Figure 3:
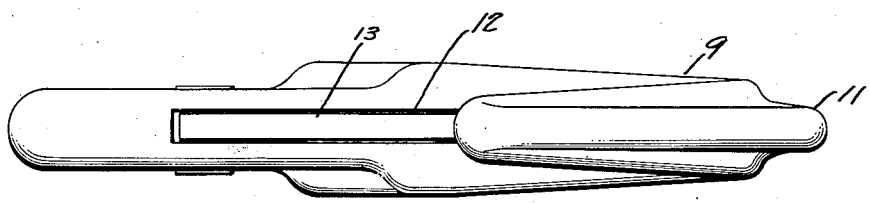
Figure 5:
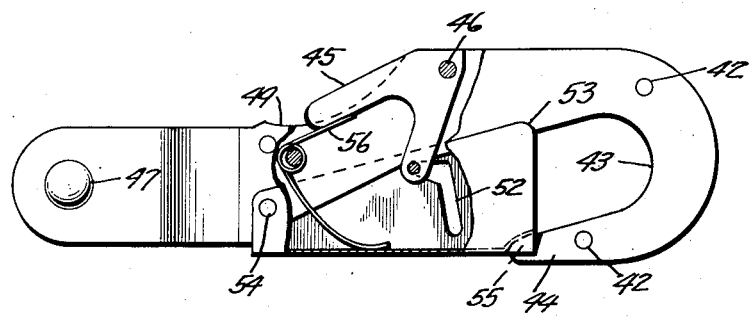
Figure 5 is a side elevation, partly cut away to illustrate the construction.
Figure 6:
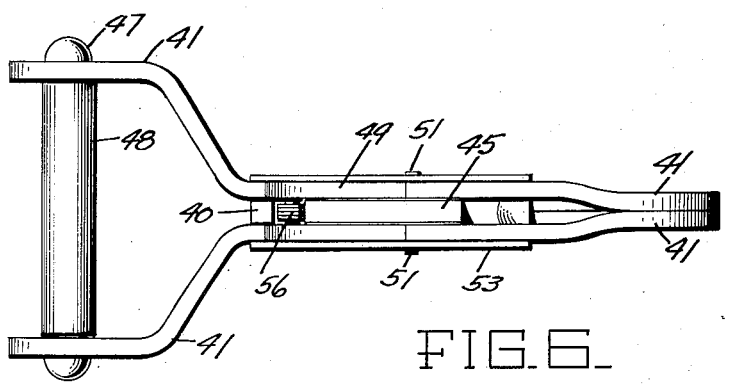
Figure 6 is a rear view of another hook.

In Figures 5 and 6 I have shown another form of hook, this one being of a lighter construction for use on safety belts. This hook is formed of two strap iron members 41 joined together by rivets 42 and cut away as at 43 to provide a bill 44 at one end thereof. The two members 41 are separated by bar 40 intermediate their ends to provide a receptacle within which bell crank latch 45 is mounted on pin 46. The members are separated at their other end, although they can be fastened together to provide an end as I have shown in Figures 1, 2, and 3. The separated ends carry a rod 47 upon which a sleeve 48 is mounted to rotate in a belt end.

The bell crank latch 45 includes one end adjacent cut out portion 49 and the other end within the separated members 41 to position pin 51 in slots 52 on the U-member 53. This member, U-member 53, is hinged on pin 54 on the members 41 and extends therefrom to provide a co-operating receptacle 55 for the end of bill 44. When the end of the bell crank latch is depressed, the pin 51 rocks counter clockwise in slot 52. The U-member 53 can then be rocked counter clockwise, the pin 51 being stationary in the slot 52. Positive release of the pin 51 is necessary inasmuch as spring 56 biases the U-member and the latch apart.

Figure 4:
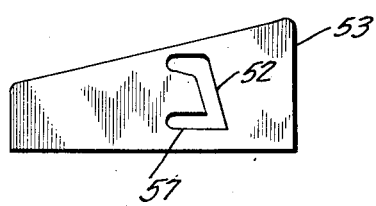
Figure 4 is a side view of a portion of another hook.

In Figure 4, I have shown the U-member 53 modified so that it can be latched in either a throat closing position or a throat open position, the slot 52 being extended as at 57 in the direction in which member 45 is moved by spring 56 so that the member 45 can retain the U-member in a throat open position.

This structure is intended for use on safety belts and has proven of great value in this use, being strong, simple and positive in operation. It is to be noted that the U-member extends across the full width of the throat, thus preventing accidental opening.

While I have disclosed only the present preferred forms of the invention, other forms can be adopted without departing from the spirit of my invention within the scope of the claims.

Claims:

1. In a safety snap hook, a hook proper having a throat, a member pivoted to said hook and adapted to close said throat, and means pivoted to said hook for engaging said member to lock the latter in throat closing position or after a pivotal opening movement of said member in a throat open position.

2. In a safety snap hook, a hollow body including a hook proper having a throat, a segment member pivoted within said body and movable from a position wholly within said body to a second position to close said throat, and a latch member for latching said segment in a selected one of said positions.

3. In a safety snap hook, a hollow body including a hook proper having a throat, a segment member pivoted within said body and movable from a position wholly within said body to a second position to close said throat, and a latch member mounted within said hollow body for latching said segment in a selected one of said positions.

4. A safety snap hook having an integral body, including a hollow portion and a hook proper having a bill forming a throat with said body, a segment member pivotally mounted on said body and movable from a bill engaging position to a position within said body whereby said throat is free and open, and means for latching said member in either position.

5. A safety snap hook having an integral body, including a hollow portion and a hook proper having a bill forming a throat with said body, a segment member pivotally mounted on said body and movable from a bill engaging position to a position within said body whereby said throat is free and open, and a latch member within said body and extending to the exterior thereof for manual manipulation to release said segment for movement to either a throat closing or a throat open position.

6. In a safety snap hook, a plurality of separated plates joined to provide a bill having a throat and a U-member hinged on said plates and extending therefrom to close said throat and engage said bill.

7. In a safety snap hook, a plurality of separated plates joined to provide a bill having a throat, a U-member hinged on said plates and extending therefrom to close said throat and engage said bill, and means provided between said separated plates for latching said U-member in bill engaging position.

8. In a safety snap hook, a plurality of separated plates joined to provide a bill having a throat, a U-member movable on said plates from a throat closing position to a throat open position, and means for latching said member in either said throat closing position or said throat open position.

9. In a safety snap hook, a plurality of separated plates joined to provide a bill having a throat, a U-member hinged on said plates and extending therefrom to close said throat and engage said bill, a bell crank hinged between said plates and a pin on said crank movable in a slot in said U-member for latching said member in said throat closing position.

10. In a safety snap hook, a plurality of separated plates joined to provide a bill having a throat, a U-member movable on said plates from a throat closing position to a throat open position, a bell crank hinged between said plates and a pin on said crank movable in a slot in said U-member for latching said member in either said throat closing position or said throat open position.

11. In a safety snap hook, a member including a bill forming a throat with said member, a throat closure member movable across said throat to close said throat, and a latch member movable toward said closure member to release said closure member from a locked throat closing position and permit said closure member to move toward said latch member to a throat open position in which said latch member latches said closure member.

WILLIAM C. BURNHAM.